United States Patent [19]
Chatterton et al.

[11] Patent Number: 6,060,269
[45] Date of Patent: May 9, 2000

[54] METHOD OF PRODUCING A PEPTIDE MIXTURE

[75] Inventors: Derek E. W. Chatterton, Aarhus; Grete Berntsen; Kristian Albertsen, both of Videbæk; Bent E. Pedersen, Løgstør, all of Denmark

[73] Assignee: MD Foods Amba, Viby J, Denmark

[21] Appl. No.: 08/981,603

[22] PCT Filed: Jun. 28, 1996

[86] PCT No.: PCT/DK96/00289

§ 371 Date: Mar. 24, 1998

§ 102(e) Date: Mar. 24, 1998

[87] PCT Pub. No.: WO97/01966

PCT Pub. Date: Jan. 23, 1997

[30] Foreign Application Priority Data

Jun. 30, 1995 [DK] Denmark .................... 0762/95

[51] Int. Cl.[7] ............ C12P 21/06; B01D 61/42; A61K 38/01
[52] U.S. Cl. ............ 435/68.1; 435/272; 210/632; 210/641; 210/645; 210/646; 210/650; 210/651; 210/652; 210/656; 530/407; 530/414; 530/833
[58] Field of Search .................... 210/632, 641, 210/645, 646, 650, 651, 652, 656; 435/68.1, 272; 530/407, 414, 833

[56] References Cited

U.S. PATENT DOCUMENTS

| | | | |
|---|---|---|---|
| 4,339,433 | 7/1982 | Kartinos et al. | 424/78 |
| 4,427,658 | 1/1984 | Maubois et al. | 424/177 |
| 4,906,616 | 3/1990 | Gilchrist et al. | 514/21 |
| 5,039,609 | 8/1991 | Klein | 435/68.1 |

FOREIGN PATENT DOCUMENTS

| | | |
|---|---|---|
| 0 218 900 | 4/1987 | European Pat. Off. |
| 0 315 135 | 5/1989 | European Pat. Off. |
| 0 601 802 | 6/1994 | European Pat. Off. |
| 0 671 126 | 9/1995 | European Pat. Off. |
| 80574 | 3/1990 | Finland. |
| 92/21248 | 12/1992 | WIPO. |

*Primary Examiner*—Francisco Prats
*Attorney, Agent, or Firm*—Finnegan, Henderson, Farabow, Garrett & Dunner, L.L.P.

[57] ABSTRACT

The present invention relates to a method for industrial production of a peptide preparation having specific specifications by hydrolysis of a protein material, preferably based on whey. The method comprises several steps, which makes it easy to control the method so as to obtain a product which, e.g. because of low mineral content, is well suited for peritoneal dialysis and parenteral feeding. The method gives a high yield.

10 Claims, No Drawings

METHOD OF PRODUCING A PEPTIDE MIXTURE

The present invention relates to an improved and industrially advantageous method of producing a peptide mixture having desired specifications, in particular as regards molecular weight, osmolality, bacteriology and content of minerals.

Such mixtures are well suited for use as or in agents for peritoneal dialysis and parenteral feeding, as well as for other pharmaceutical and cosmetic applications.

The normal function of the mammalian kidneys includes such activity as maintaining a constant acid-base balance and electrolyte balance, and removing excess fluids and undesirable products of the body's metabolism from the blood. In an individual with renal disease, this functioning of the kidney may be reduced to as low as 5% or less of the normal level. When the renal function has decreased significantly, artificial means must be employed to substitute for the kidney activity if life is to be sustained. This is accomplished clinically by the use of dialysis. One of the most common methods for achieving this is haemodialysis, in which the patient's blood is passed through an artificial kidney dialyser. In this dialyser, a synthetic semi-permeable membrane acts as an artificial kidney with which the patient's blood is contacted on one side, while on the opposite side of the membrane there is a dialysing fluid or a dialysate, the composition of which is such that the undesirable products in the patient's blood will naturally pass across the membrane by diffusion, into the fluid. The blood is thus cleansed, in essentially the same manner as the kidney would have done, and the blood is returned to the patient's body. This method of dialysis requires the patient to be physically "hooked up" to the dialyser for several hours, often several times a week. Although efficient, this method, for obvious reasons, presents a number of inconveniences.

Some of the disadvantages associated with haemodialysis, which requires extracorporeal treatment of the blood, are overcome by the use of techniques which utilize the patient's own peritoneum as the required semi-permeable membrane. The peritoneum is the membranous lining which contains large numbers of blood vessels and capillaries, and which is thus capable of acting as a natural semi-permeable membrane. Dialysing solution is introduced into the peritoneal cavity via a catheter in the abdominal wall. A suitable residence time for the dialysate permits it to exchange solutes between the dialysate and the blood. Fluid removal is achieved by providing a suitable osmotic gradient from the blood to the dialysate so as to permit water outflow from the blood. Thus, the correct acid-base balance, electrolyte balance, and fluid balance are imparted to the blood, and undesired products are removed from the blood. The dialysing solution is quite simply drained from the body cavity through the catheter after completed dialysis. Although there are more than one type of peritoneal dialysis, the technique known as continuous ambulatory peritoneal dialysis (CAPD) is particularly favoured, since it does not require the patient to remain tied to the apparatus for the duration of the replacement of solutes and fluid. The only sedentary period required is during infusion and draining of the dialysing solution.

There are quite specific requirements as regards the composition of agents for use in peritoneal dialysis. These requirements may further vary from patient to patient. The agents need of course to be non-toxic. Additionally, they must have the correct specifications as regards molecular size, conductivity, and content of salts and minerals.

The agent which has currently achieved the most widespread acceptance as regards achievement of the required osmotic gradient is glucose. Glucose has the advantage of being non-toxic as well as being readily metabolizable if it enters the blood. The major problem with its use is, however, that it is readily taken up in the blood from the dialysate. Although any substance will eventually find its way into the blood circulation, glucose crosses the peritoneum so rapidly that the osmotic gradient is broken down within 2–3 hours of infusion. This may even cause a reversal of the direction of ultrafiltration, causing the unwanted result, i.e. that water is reabsorbed from the dialysate toward the end of the dialysis treatment. Further, the amount of glucose which is taken in may represent a large proportion of the patient's energy intake, possibly being as high as high as 12–35%. While this does not significantly affect a non-diabetic patient, it can be a severe metabolic burden to a patient whose glucose tolerance is already impaired. This added burden may be implicated in hyperglycaemia and obesity, which has been observed in a number of CAPD-patients. Diabetic patients suffer from the further inconvenience and risk of having to add insulin to the peritoneal dialysate, in order to reduce the risks of hyperglycaemia resulting from the increased glucose load.

Dialysing fluid containing glucose may reduce the filtration efficiency of the peritoneum because of non-enzymatic glycosylation of the proteins in the peritoneum. In this connection reference is made to an article by James W. Dobbie "New Concepts in Molecular Biology and Ultrastructural Pathology of the Peritoneum: Their Significance for Peritoneal Dialysis" in American Journal of Kidney Diseases Vol. XV, No. 2, February 1990, pages 97–109.

Use of glucose also presents problems in the preparation of the dialysate. Sterilization of the dialysate is typically accomplished by heating which, at a physiological pH-value, will cause glucose to caramelize. To compensate for this, the pH-value of the dialysate is usually adjusted to 5.0–5.5. This low pH-value, so far below that which is normal for the body, may be responsible for the pain experienced by some patients on inflow, and could cause sclerosis of the peritoneal membrane, which will in turn cause a decrease in solute equilibration or removal (Schmidt et al., Arch. Int. med., 141: 1265–1266, 1980).

These disadvantages make the finding of a suitable alternative to glucose as an osmotic agent highly desirable. A number of substances have been suggested to meet the criteria of being biologically inert, not readily crossing the peritoneal membrane, being non-toxic, and exerting an adequate osmotic pressure. A number of the suggested materials have proven to be non-suited substitutes for glucose. For example, the use of dextrans (Gjessing, Acta Med. Scan., 185:237–239, 1960) or polyanions (U.S. Pat. No. 4,339,433) has been proposed because of their high molecular weight. Hereby a reduction in their diffusion across the peritoneum into the blood is achieved. The role of the lymphatic system in the process of solute transport, however, clearly limits the advantages of the high molecular weight per se (Allen et al., Amer. J. Physiol., 119:776–782, 1937). Also, with respect to the polyanions, it is unclear how their toxic action would be, since most of them are non-metabolizable. Similar problems with metabolism are observed with compounds such as sorbitol, xylitol and glucose polymers. Sorbitol, which is very slowly metabolized, has been associated with instances of hyperosmolar coma and death (Raja et al., Ann. Int. Med., 73: 993–994, 1970), and is no longer used. Both xylitol and glucose polymers also tend to accumulate in the blood, and may be associated with unpleasant side effects (Bazyato et al., Trans Amer. Soc. Artif. Interm. Organs, 28: 200–286, 1982). Fructose, which is comparable with glucose in its osmotic capacity, also exhibits many of the same disadvantages. Because of its high cost, it has not achieved any widespread use.

More promising is the proposed use of amino acids to replace glucose. Amino acids are well-tolerated, with no known adverse side effects (Oren et al., Perit. Dial. Bull, 3: 66–72). Because of their lower molecular weight, they exert a higher osmotic effect, on a mass basis, than glucose. However, this also probably results in a more rapid uptake into the blood, causing rapid loss of osmotic gradient. Although amino acid uptake, unlike glucose uptake, may be beneficial, in that it may compensate for the protein loss observed in many CAPD patients, there is a considerable disadvantage in the almost prohibitive costs of amino acid solutions when compared with glucose. Furthermore, the more rapid uptake of amino acids results in a considerable nitrogen burden which significantly increases the blood urea nitrogen levels. Thus, it is seen that even amino acids do not provide the appropriate substitutes.

Improvements in the method for peritoneal dialysis have been achieved by the invention disclosed in DK 168 080, which is described in more detail below. Here use is made of an osmotic agent which is not only a safe and beneficial alternative to glucose, but which is also economical in use. It has been found that a mixture of relatively low molecular oligopeptides (300–2000 Daltons) derived from the enzymatic hydrolysis of a high-quality protein, such as whey protein, may be used as an effective osmotic agent in a peritoneal dialysing solution. In comparison with an amino acid solution, the somewhat higher molecular weight of the peptides prevents the rapid uptake into the blood, allowing a more effective maintenance of the osmotic gradient, as well as preventing an unwanted increase of nitrogen in the blood. The peptide mixture, which is ultimately, although very slowly, absorbed into serum further provides a valuable dietary supplement, the peptide mixture being derived from a high-quality protein. Finally, the present peptide mixture provides a low cost and easily accessible source of osmotic agent.

Peptides having a molecular weight in excess of about 5000 Daltons may pose allergic problems, which of course is particularly unacceptable in products being introduced into the body.

A peptide mixture of the present kind may further be combined with any osmotically balanced aqueous solution suitable for use as a peritoneal dialysate. Useful dialysates must contain, in order to be effectively osmotically balanced for the present purpose, electrolytes in a concentration sufficient for causing diffusion of water and undesired metabolic products across the peritoneum. There is no standard dialysing solution, since the requirements may vary from one individual to the other. A usual solution would e.g. contain specific quantities of sodium, chloride, lactate, magnesium and calcium. The content of a typical dialysate solution appears from the following listing, without specification of the amount of osmotic agent. In a glucose solution, glucose monohydrate would typically be added in an amount from about 1.5 to 4.25%. It will be understood that this represents just one example of a possible solution, and the variations in the pattern will be apparent to the person skilled in the art. The proportion of peptide mixture in the dialysate may vary, but normally lies in the range from about 1 to about 15 weight-% of the dialysate solution. In any event, the amount of peptide used must be sufficient for conferring, together will supporting electrolytes, an osmolality from about 300 to about 500 mOsm/l (the normal serum osmolality being 280 mOsm/l). Administration of the dialysate is achieved in the manner usually followed for peritoneal dialysis. Exemplary modes of peritoneal dialysis are described in "Peritoneal Dialysis", K. Nolph, ed., Martinus Nighoff Publishers, 1981. The particular treatment required by any individual patient is readily determinable by the patient's physician.

Components of a typical peritoneal dialysing solution are (in meq/l):

| | |
|---|---|
| Sodium | 132.0 |
| Calcium | 3.5 |
| Magnesium | 0.5 |
| Chloride | 96.0 |
| Lactate anion | 40.0 |

From international patent application WO 87/01286 and the corresponding EP patent specification No. 270 545, U.S. Pat. No. 4,906,616, and Danish patent specification No. 165 734 it is known to produce a dialysing fluid by enzymatic hydrolysis of dairy products. Among these, the whey fraction is mentioned, but it is stated that it suffers from the drawback of having a rather indefinite chemical composition and of containing a number of residual proteins which are difficult to remove, which entails that there is a tendency that the hydrolysis is non-reproducible, and that the hydrolysis product gets contaminated. Consequently, use of β-lactoglobulin and α-lactoalbumin, and in particular the casein fraction, is preferred. The enzymatic hydrolysis is performed on an aqueous solution of sodium caseinate. After the hydrolysis, filtration is performed through a bacteria filter, and the product is adjusted to the desired osmolality, and the pH by addition of salt.

Casein, however, is less suited because of a high phosphorous content which is unsuited for patients suffering from kidney diseases.

From EP patent specification No. 218 900 and the corresponding Danish patent specifications No. 168 692 and 168 080 and U.S. Pat. No. 5,039,609, as previously mentioned, mixtures of peptides having a molecular weight from about 300 to approx. 2000 Daltons are known, which mixtures are well suited for use as osmotically active agent in connection with peritoneal dialysis. The same references disclose a method of producing such a mixture from a high-quality protein by enzymatic hydrolysis followed by dialysis and reverse osmosis. As protein, use is made e.g. of whey protein. The process is rather cumbersome and requires a very special equipment, and it is not possible to vary the composition. This is of particular importance to low molecular N-containing substances, lactose and minerals, in particular aluminium, since by this process it is not possible to remove these components once they have been included in the dialysate.

Further, WO 94/14468 discloses dialysing solutions containing peptides and glucose. It does not disclose any special method of producing such peptides. U.S. Pat. No. 4,427,658 discloses a hydrolysate of whey protein which is particularly well suited for nutritional purposes. It is fully hydrolysed, and consequently has a high content of free amino acids. There may be as much as 15% free amino acids. This is not generally desirable, and especially not for dialysis where the recommended concentration is below 5%. The hydrolysate is produced by hydrolysis with a proteolytical enzyme, e.g. pancreatin, and the hydrolysis is continued until there is no precipitable nitrogen with 12% trichloroacetic acid.

International patent application No. WO 92/21248 relates to a method of producing a whey protein hydrolysate for nutritional purposes by using a whey protein product having a protein content of at least 65%, calculated as dry matter, as starting material, and a combination of a non-pH-stat hydrolysis followed by an ultrafiltration/microfiltratiori. The method provides a well-tasting and organoleptically acceptable product in high yield. However, the product has a mineral content which is too high for dialysis products.

It has now turned out to be possible to produce peptide preparations well suited for dialysis, parenteral feeding and other purposes, which have an expedient molecular weight and an expedient content of nitrogen and minerals, depending upon what is needed. This is accomplished by means of a particularly advantageous method by which it is possible easily and economically to control the composition of the preparation. The method can be carried out by means of readily accessible equipment.

The method according to the invention for producing a peptide mixture which is well suited for use in peritoneal dialysis and/or parenteral feeding and for other purposes, which mixture has a peptide molecular weight of 200–2000 Daltons, and low mineral content, is of the kind by which a protein is treated in an aqueous solution under hydrolysing conditions, and it is characterized in that it comprises the following steps:

a) hydrolysing until an osmolality increase in the range 120–250 mOsm/kg $H_2O$, as measured in an 8% protein solution, is achieved, b) microfiltering, centrifuging or separating chromatographically in order thereby to remove undesired high molecular substances, c) ultrafiltering the permeate from step (b), or treating it by a chromatographical method in order thereby to isolate the desired peptides, d) nanofiltering the permeate from step (c), or treating it by a chromatographical method, e) collecting the retentate from the nanofiltration, possibly cooling it, f) electrodialysing the retentate from step (e) after preceding adjustment of pH to the optimum value for the electrodialysis, g) optionally sterile filtering the product obtained, h) whereafter the sterile product is dried, if desired.

By this method according to the invention it is possible to produce a peptide mixture having a molecular weight from 200 to 2000 Daltons, preferably from 400 to 1500 Daltons, and in particular less than 1000 Daltons, which is desirable for a dialysis ingredient. By the method according to the invention it is also possible to produce a peptide mixture having extremely low mineral content, viz.

a phosphorous content of maximally 0.01% an aluminium content of maximally 0.5 ppm, a sodium content of maximally 0.6%, a chloride content of maximally 0.7%, a potassium content of maximally 0.02% and a magnesium content of maximally 0.01%.

Whey protein is a well suited protein starting material. This especially goes for a whey protein concentrate. A particularly preferred whey protein concentrate is the product sold under the trade mark BIPROR. It contains 90% protein and has a very small content of fat, lactose and minerals. Nutrition-wise, whey protein has high value, e.g. higher TD (true digestibility), BV (biological value), NPU (net protein utilization), and PER (protein efficiency ratio) than soya isolates and casein, values of the same size as whole egg (white+yolk).

Approx. 50% of the peptides in the peptide mixture produced by the method according to the invention consist of essential amino acids. Consequently, this peptide mixture will also be well suited for i.a. parenteral and peripheral-parenteral feeding by suitable admixing of carbohydrates, fat, vitamins, minerals, etc. In this connection reference is made to Encyclopaedia of Food Science, Food Technology and Nutrition, page 3420–3422 "Parenteral Nutrition", and to Essentials of Nutrition and Diet Therapy, 1994, Mosby; chapter 18, Feeding Methods: "Enteral and Parenteral Nutrition".

However, it is also possible to use other protein starting materials, such as e.g. casein and soya protein, but, as mentioned, they are not as advantageous as whey-based starting materials.

Acid or base hydrolysis is, in principle, usable, but a better yield is obtained by enzymatic hydrolysis. The acid or base hydrolysis further gives a more uncontrolled process with varying composition, and some amino acids can even be destroyed by the process, e.g. Lee, Val and/or Ile. Consequently, preference is normally given to enzymatic hydrolysis.

Useful enzymes include e.g. pepsin, trypsin, chymotrypsin and pancreatin. In particular the enzyme products Alcalase® and Neutrase® from Novo Nordisk A/S have proved to be well suited.

Dependent upon enzyme choice and starting material a heat treatment can be carried out of the starting material dissolved in water prior to the hydrolysis, which brings about an opening of the protein, which may increase the yield and/or reduce the treatment time. If a heat treatment is performed, a treatment at a temperature about 80–90° C. for 1–3 minutes will usually be appropriate in case of whey protein. An enzymatic hydrolysis with Alcalase® and Neutrase® is carried out at 30–65° C., preferably 52–53° C., but the hydrolysis temperature of course depends on the enzyme or enzymes used.

The degree of hydrolysis is monitored by measuring the osmolality increase, or determining amino-nitrogen, or by titration with base. During the hydrolysis pH may be constant or vary, depending on enzyme used. pH thus normally varies between 8.5 and 6.0 when using Alcalase®/Neutrase®.

The content of the hydrolysis mixture of non-hydrolysed protein, aggregates and fat components is separated from the hydrolysis mixture e.g. by microfiltration, centrifugation, or a chromatographic method in order hereby to separate the peptides from the original hydrolysis mixture.

By diafiltration the retentate, an increased yield of peptides in the permeate is obtained. This process step is performed under high separating capacities, and the majority of the high molecular substances is removed from the peptides (the permeate). In order to remove the remainder of the high molecular components from the permeate ultrafiltration is performed, or chromatographical purification of the permeate is carried out. These process steps take place at significantly lower separating capacities than the preceding microfiltration, and are to ensure the removal of all high molecular material from the peptide mixture. For removal of water and low molecular nitrogen containing material and salts, the peptide mixture is separated by means of nanofiltration or chromatographical methods. The resulting peptide mixture is hereby upconcentrated as regards dry matter, and at the same time a reduction in the content of minerals and nitrogen containing material has been obtained.

In the electrodialysis step the best mineral removal is achieved at pH 4–5, in particular about 4.5. The electrodialysis is easily monitored by measuring the conductivity, which is reduced in step with the mineral removal. Such removal of minerals is significant in products for peritoneal dialysis and parenteral and peripheral-parenteral feeding.

Generally, pH and the temperature are adjusted during the individual process steps so as to achieve the optimal process conditions for enzymes and separations.

Further, sterilizing steps are introduced for removal of bacteria and germs in order to obtain a final product having very high bacteriological quality.

The method according to the invention possesses great advantages over the known art. In particular, these advantages reside in the split-up steps, which offer an improved possibility of intervening in the process at the right place and controlling it and, as a result, the composition of the desired product. Further, it is an economically advantageous process giving a high yield.

As mentioned, it can be carried out in commonly used equipment, viz. equipment which i.a. is used within the dairy sector, which is not the case as regards the method known from EP 218 900, which employs specially built apparatus. Of course this means that the method according to the invention, as compared with the known techniques, for this reason alone is more economical to carry out.

In the above Danish patent No. 168 080, see page 14, line 27 ff, it is maintained that ultrafiltration is associated with a severe disadvantage in that reliable separation cannot be obtained. By the method according the invention this problem has been solved by using a special ultrafiltration membrane (UF-membrane) whereby molecules having a molecular weight considerably in excess of 2000 Daltons only occur in minimal and insignificant amounts in the peptide mixture produced by the method according to the invention. Such UF-membranes have been commercially available since 1984.

Further, in the present method use is, as mentioned, preferably made of a special starting material, viz. a whey protein product having as much as 90% protein and a very low content of both fat and lactose and minerals. The content of fat is typically about 0.5%, and the content of lactose is typically 0.5%, while the mineral content is 1.6%. Thereby a sufficiently pure product is more easily obtained, since fat, lactose and minerals are undesirable for the applications mentioned. Further, also the germ content is very low.

The invention is explained in more detail by way of the following example.

EXAMPLE 20.0 kg whey protein isolate powder are dissolved in 210 litres demineralized water. The solution is heat treated at 85° C. for 2 minutes, cooled to about 50° C., and transferred to a hydrolysis tank. 0.2% of the enzyme product ALCALASE®-2.4 L and 0.1% of the enzyme preparation NEUTRASE®-0.5 L are added. Both enzymes used are sold by Novo-Nordisk A/S. After hydrolysis for 15 hours at about 50° C. the osmolality increase is 166 mOsm/kg $H_2O$. The product is heated to 60° C., and is hereafter microfiltered on a 0.2 $\mu$m membrane from the company Société des Céramique Techniques, France. The microfiltration takes place at about 60° C., and diafiltration is with about 200 litres demineralized water. The average flux is about 150 $l/(m^2 *$ hour). The permeate is collected and heat treated at 85° C. for 3 minutes, and cooled to 50° C. Hereafter the permeate is ultrafiltered at 50° C. on an ultrafiltration membrane of the type Desal G50 from the company Desalination Systems, Inc., Escondido, Calif., USA. The membrane has a cut-off of 15000. The average flux at the ultrafiltration is 5.8 $l/(m2 *$ hour). The permeate is heat treated at 70° C. for 2 minutes, and cooled to 60° C., whereafter it is nanofiltered on a membrane of the type PCI AFC30 from the company PCI Membrane Systems Ltd., England, at about 60° C. The average flux is 240 $l/(m^2 *$ hour). The nanofiltration retentate is heat treated at 70° C. for 2 minutes, and cooled to 5° C., whereafter it is adjusted to pH 4.5 by means of diluted HCl. The product is electrodialysed at about 10° C. and a voltage in the area around 50 V, and during the process the current is reduced from 6.5 A to 0.5 A. The conductivity hereby decreases to 0.8 mS. The eletrodiialysis membranes are of the type NEOSEPTA-AMX and -CMX from the company Eurodia, France. Hereafter, the eletrodialysis retentate is collected and heat treated at 70° C. for 2 minutes, and cooled to 60° C., whereafter it is sterile filtered on a filter of the type 0.05 $\mu$m filter from the company Société des Céramique Techniques, France, at 60° C. The average flux is 2300 $/l(m^2 *$ hour). The collected sterile filtered product is dried on a spray tower of the type Niro Minor from the company Niro Atomizer, Denmark, and 9.0 kg peptide mixture in powder form is obtained.

The product obtained is analyzed, yielding the following results:

| | |
|---|---|
| pH | 4.75 |
| Protein content | 90.5 weight-% (N % * 6.38) |
| Dry matter content | 96.8 weight-% |
| Fat content | <0.02 weight-% |
| Lactose content | <0.1 weight-% |
| Ash content | 0.17 weight-% |
| Phosphorous content | 0.007 weight-% |
| Sodium content | 0.012 weight-% |
| Potassium content | 0.006 weight-% |
| Chloride content | <0.05 weight-% |
| Calcium content | 0.008 weight-% |
| Aluminium content | <0.5 ppm after weight |
| $\overline{M_w}$ *) | 620 |
| $\overline{M_n}$ *) | 410 |
| Molecular weight <2 000 D *) | 99.24 |
| Molecular weight <1 000 D *) | 86.46 |
| Total germ content | <1 per gram |

*) Molecular weight determinations were made using a Waters high-pressure pump (510), injector and detector (214 nm). The columns used were 3 × TSK G2000 SWXL series connected and operated at ambient temperature. Mobile phase consisted of 0.05 M phosphate buffer/0.5 M ammonium chloride solution containing 0.1% TFA and 25% acetonitrile. The columns were calibrated with several peptide standards having different molecular weight. By the least squares methodthe best suited 3rd degree polynomium was calculated. The resulting curve was used as calibration curve.

The sample was dissolved in mobile phase to a concentration of 5 mg/ml. 20 microlitres sample was injected. The detector response vs. the elution volume was recorded. The chromatogram was divided into time segments (and elution volume segments), each segment being characterized by the elution volume and the area of the chromatogram over the time interval.

The molecular weights after weight and number, respectively, were determined according to the following equations:

$$\overline{M_w} = \frac{\sum_i (A_i = M_{w,i})}{\sum_i A_i} \qquad \overline{M_u} = \frac{\sum_i A_1}{\sum_i (A_i / M_{w,j})}, \text{ where}$$

-continued $\overline{M_w}$ is the average molecular weight after weight, $\overline{M_u}$ is the average molecular weight after number, $A_i$ is the area of the chromatogram for each segment, measured as the accumulated detector response over each time interval. Mw,i is the corresponding molecular weight for each segment. The value is calculated by means of the calibration curve by use of the average elution volume over the time interval.

Amino acid analysis, weight-%:

| | |
|---|---|
| Tyrosine | 3.70 |
| Tryptophane | 1.90 |
| Cystine | 2.62 |
| Methionine | 2.05 |
| Aspart acid | 10.9 |
| Threonine | 4.53 |
| Serine | 3.95 |
| Glutamic acid | 17.1 |
| Proline | 4.43 |
| Glycine | 1.70 |
| Alanine | 5.69 |
| Valine | 5.14 |
| Isoleucine | 5.38 |
| Leucine | 12.0 |
| Phenylalanine | 3.53 |
| Histidine | 2.33 |
| Lysine | 10.3 |
| Arginine | 1.91 |

We claim:

1. A method of producing a peptide nixture suitable for use in peritoneal dialysis and/or parenteral feeding, which mixture has a peptide molecular weight between 200 and 2000 Daltons and a low mineral content wherein the aluminum content is no greater than 0.5 ppm, by which method a protein is treated in an aqueous solution under hydrolysing conditions comprising
    a) hydrolysing until an osmolality increase in the range 120–250 mOsm/kg $H_2O$, as measured in an 8% protein solution, is achieved
    b) microfiltering with a membrane of about 0.2 μmm Daltons to obtain a permeate,
    c) ultrafiltering the permeate from step (b) to isolate the desired peptides,
    d) nanofiltering the permeate from step (c) to remove water and low molecular nitrogen containing material and salts,
    e) collecting the retentate from the nanofiltration, and optionally cooling it,
    f) electrodialysing the retentate from step (e) after preceding adjustment of pH to the optimum value for the electrodialysis,
    g) optionally sterile filtering the product obtained,
    h) whereafter the sterile product is optionally dried.

2. A method according to claim 1 of producing a peptide mixture having a low mineral content with the following composition:
    a phosphorous content of maximally 0.01%,
    a sodium content of maximally 0.6%,
    a chloride content of maximally 0.7%,
    a potassium content of maximally 0.02%, and
    a magnesium content of maximally 0.01%.

3. A method according to claim 1 of producing a peptide mixture having a molecular weight from 400 to 1500 Daltons.

4. A method according to claim 1 of producing a peptide mixture having a molecular weight between 200 and 1000 Daltons.

5. A method according to claim 1, wherein the protein material used as starting material is a whey product.

6. A method according to claim 5, wherein the protein material used as starting material is a whey protein isolate which isolate has a protein content of about 90%.

7. A method according to claim 1, wherein the hydrolysis is an enzymatic hydrolysis.

8. A method according to claim 7, wherein the enzymatic hydrolysis is carried out with a bacterial protease enzyme.

9. A method according to claim 1, wherein in between the individual steps, heat treatment and/or cooling is/are performed.

10. A method according to claim 5, wherein the whey product is a whey protein concentrate.

* * * * *

UNITED STATES PATENT AND TRADEMARK OFFICE
CERTIFICATE OF CORRECTION

PATENT NO. : 6,060,269
DATED : May 9, 2000
INVENTOR(S) : Derek E.W. Chatterton er al.

It is certified that error appears in the above-identified patent and that said Letters Patent is hereby corrected as shown below:

Column 9,
Line 33, "nixture" should read --mixture--.
Line 42, after "achieved", insert --,--.
Line 43, "0.2 μmm" should read --0.2 μm--.
Line 44, before "to obtain", delete "Daltons".

Signed and Sealed this

Twenty-eighth Day of August, 2001

Attest:

NICHOLAS P. GODICI
Attesting Officer     Acting Director of the United States Patent and Trademark Office

UNITED STATES PATENT AND TRADEMARK OFFICE
CERTIFICATE OF CORRECTION

PATENT NO. : 6,060,269
DATED : May 9, 2000
INVENTOR(S) : Dereck E.W. Chatterton et al.

It is certified that error appears in the above-identified patent and that said Letters Patent is hereby corrected as shown below:

<u>Title page,</u>
Item [75], Inventors, "Derek" should read -- Dereck --.

Signed and Sealed this

Fifteenth Day of April, 2003

JAMES E. ROGAN
*Director of the United States Patent and Trademark Office*